No. 612,852. Patented Oct. 25, 1898.
L. LEGGETT.
FRUIT PICKER.
(Application filed Oct. 7, 1897.)
(No Model.)
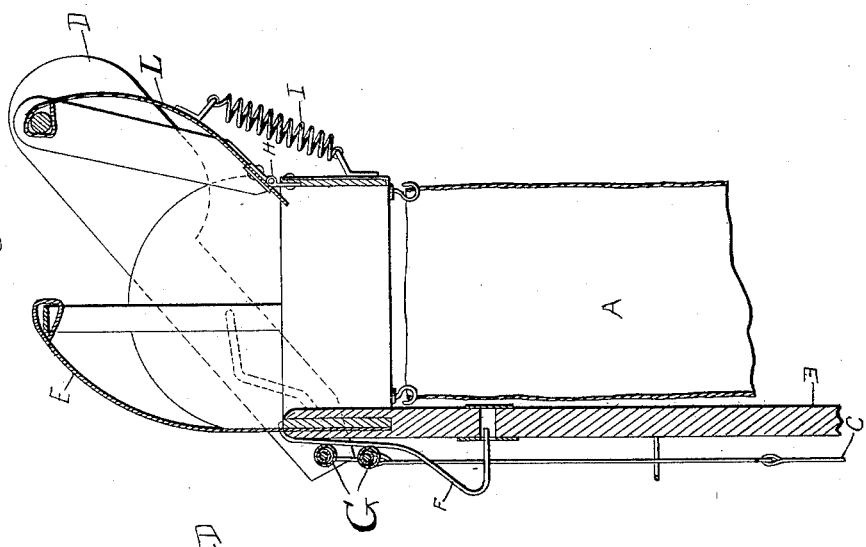
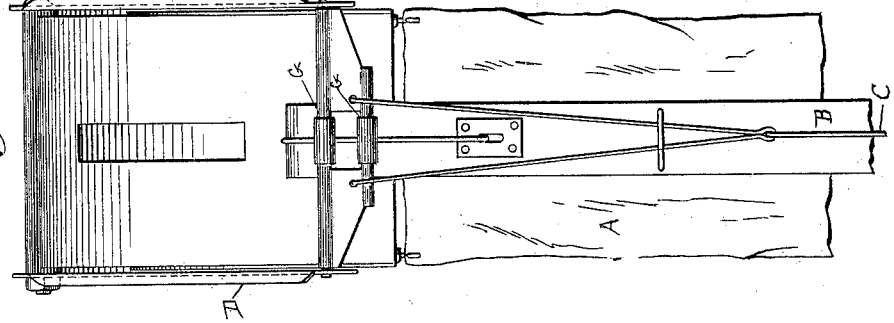
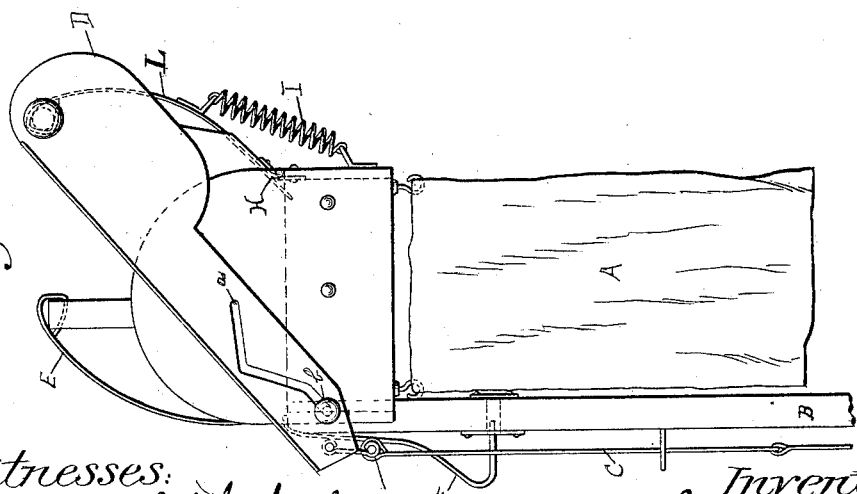
Witnesses: William E. Mitchell, G. J. Hatten
Inventor: Leroy Leggett

UNITED STATES PATENT OFFICE.

LEROY LEGGETT, OF SIDNEY, IOWA.

FRUIT-PICKER.

SPECIFICATION forming part of Letters Patent No. 612,852, dated October 25, 1898.

Application filed October 7, 1897. Serial No. 654,486. (No model.)

*To all whom it may concern:*

Be it known that I, LEROY LEGGETT, a citizen of the United States, residing at Sidney, in the county of Fremont and State of Iowa, have invented a new and useful Fruit-Picker, of which the following is a specification.

My invention relates to improvements in fruit-pickers where two jaws, one of which is spring-controlled, operate to pluck the fruit from the tree and pass it to a suitable receptacle for storing, the device being held on a handle and operated by a person who stands on the ground. I attain these objects by the mechanism illustrated in the accompanying drawings, in which—

Figure 1 is a side elevation; Fig. 2, a back view; Fig. 3, a section taken longitudinally of Fig. 1.

Similar letters refer to similar parts throughout the several views.

The receptacle A, which may be a sack, is attached to the fruit-picker to receive the fruit after it has been plucked from the tree. This is attached to the fruit-picker by any well-known means.

B is an upright rigid piece upon which the fruit-picker is supported at the upper end, while the lower end is held by the operator. Over the upright rigid piece works a wire rod or cord C for the purpose of closing the jaws of the fruit-picker. This rod is also extended to the lower end of the upright rigid piece to be manipulated by the operator, who stands on the ground while picking the fruit.

The fruit-picker proper is composed of two jaws D E, which operate to close together in such way that their upper edges meet, the fruit being grasped below these edges and passed on down to the receptacle A. Jaw D is slotted, as at $a$, and works over a pivot at $b$. F is an inclined bearing-surface over which the rollers G G pass when rod or cord C is drawn taut to close the device. Rod or cord C is forked at its upper end to fasten into the lower end of jaw D for bringing jaw D in contact with jaw E, which is fastened stationary to the upright piece B. Jaw D is hinged at H.

L is the back plate of the movable jaw D, to which spring I is attached. Spring I is connected to the rear surface of jaw D and operates to automatically open jaw D when the force is removed from rod or cord C.

On the contact edge of jaw E a knife may be placed to cut the stems of fruit which requires some force for its removal from the tree.

Having described my invention, what I claim, and desire to secure by Letters Patent, is—

1. A fruit-picker having the slotted jaw D hinged at H with back plate L, adapted to close against the jaw E, the jaw E having a means for attachment of receptacle A, the forked rod C, the spring I connected to the rear surface of jaw D, operating to open automatically jaw D, as and for the purposes set forth.

2. A fruit-picker having the slotted jaw D hinged at H with back plate L having spring I attached thereto adapted to close against the jaw E, the upright piece B having the wire rod attached thereto, the rollers G G, the pivot $b$, the forked rod C, all substantially as described.

LEROY LEGGETT.

Witnesses:
E. E. HARRIS,
H. C. DYE.